(12) United States Patent
Cha et al.

(10) Patent No.: US 12,147,600 B2
(45) Date of Patent: Nov. 19, 2024

(54) VIRTUAL REALITY GLOVE HAVING TENSION DETECTOR

(71) Applicant: KOREA UNIVERSITY RESEARCH AND BUSINESS FOUNDATION, Seoul (KR)

(72) Inventors: Youngsu Cha, Seoul (KR); Jiyong Min, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/474,498

(22) Filed: Sep. 26, 2023

(65) Prior Publication Data

US 2024/0111363 A1  Apr. 4, 2024

(30) Foreign Application Priority Data

Sep. 27, 2022  (KR) .......................... 10-2022-0122128

(51) Int. Cl.
*G06F 3/01* (2006.01)
*A41D 19/00* (2006.01)

(52) U.S. Cl.
CPC .......... *G06F 3/014* (2013.01); *A41D 19/0027* (2013.01)

(58) Field of Classification Search
CPC ....................... G06F 3/014; G06A 4119/0027
USPC ....................................................... 345/156
See application file for complete search history.

(56) References Cited

U.S. PATENT DOCUMENTS

| 2019/0004604 A1* | 1/2019 | Wang ...................... G06F 3/016 |
| 2019/0294249 A1* | 9/2019 | Martin ................... G06F 3/0346 |
| 2020/0130011 A1* | 4/2020 | Rauch ..................... G10K 11/24 |
| 2023/0020111 A1* | 1/2023 | Zhu ......................... G06F 3/014 |

FOREIGN PATENT DOCUMENTS

| KR | 10-0252082 B1 | 4/2000 |
| KR | 10-1835097 B1 | 3/2018 |
| KR | 10-2330897 B1 | 12/2021 |
| KR | 10-2022-0082089 A | 6/2022 |

OTHER PUBLICATIONS

Choi, Taehun et al., "Piezoelectric Sensor Using Tensile Load for Measuring Rotational Motion," 17th Korea Robotics Conference, 2022, (2 Pages in Korean).

\* cited by examiner

*Primary Examiner* — Calvin C Ma
(74) *Attorney, Agent, or Firm* — NSIP Law (57) ABSTRACT

A Virtual Reality (VR) glove and a VR system are disclosed. The VR glove includes a glove body and a detector, the detector includes a housing having an accommodation space therein, a piezoelectric member having a first side fixed at a first side in the accommodation space, and a wire connected to the piezoelectric member and extending through a hole provided at a second side of the housing, and the wire is attached to any one finger of a plurality of fingers included in the glove body.

15 Claims, 6 Drawing Sheets

▨ : Substrate
▦ : PCDF film

FIG. 5B

○ : Elastic Holes
○ : Wire Holes

VIRTUAL REALITY GLOVE HAVING TENSION DETECTOR

CROSS REFERENCE TO RELATED APPLICATION

The present application claims priority to Korean Patent Application No. 10-2022-0122128 filed on Sep. 27, 2022, the entire contents of which is incorporated herein for all purposes by this reference.

BACKGROUND OF THE INVENTION

Field of the Invention

The present disclosure relates to a glove linked with a virtual reality (VR) and, particularly, to a VR glove that can interact with an object by moving virtual fingers in a virtual reality space on the basis of variation of fingers obtained through a tension detector implemented at a wrist part while preventing any electronic device from being positioned at a hand part using the tension detector.

Description of the Related Art

A virtual reality (VR) means a virtual reality for experience in a virtual space implemented by a computer. Senses and movement of a person are transmitted to a computer using wearable devices to interact with a virtual reality. Such devices are wirelessly connected or show excellent performance in real-time tracing of movement. In particular, a hand is important in interaction with other objects in a virtual reality, so it is important to figure out movement of a hand.

A portable glove-type interface that is useful for tracing every joint in real time is used to trace movement of a hand. As an example of such an interface, in Korean Patent No. 0252082, movement is measured using a deformation detector that measures deformation of an elastic member on the basis of rotation angles of finger joints using a frame, a spring, and a wire. However, since this device is composed of a hard structure and a detector, it is difficult for a user to wear the device.

In order to reduce such difficulty, a piezoelectric element made of a soft material is used to enable a detector to smoothly move with a joint and to prevent difficulty in wearing in Korean Patent No. 1835097. However, since a detector is still positioned at each finger joint part, there is a high possibility of a breakdown of the detectors due to frequent movement of fingers.

As a result, it is required to develop a wearable glove that does not employ a hard material and has no electronic element at a hand part.

SUMMARY OF THE INVENTION

An objective of the present disclosure is to be able to reduce difficulty for a wearer in using a detector having a soft material and prevent a breakdown of the detector due to repetitive movement of a hand by positioning the detector and a data transmitter at a wrist in a VR glove.

A VR glove according to an embodiment of the present disclosure includes a glove body and a detector, the detector includes a housing having an accommodation space therein, a piezoelectric member having a first side fixed at a first side in the accommodation space, and a wire connected to the piezoelectric member and extending through a hole provided at a second side of the housing, and the wire is attached to any one finger of a plurality of fingers included in the glove body.

According to the VR glove and the VR system of an embodiment of the present disclosure, since a detector is positioned on a wrist, it is possible to freely move a hand part and prevent a breakdown of the detector.

Further, the detector is enabled to be moved in a predetermined direction using a frame fixing a sensor, and it is possible to mount and use several detectors even in a narrow space.

Further, since a glove and a wrist protector are provided, easy attachment/detachment is possible.

DETAILED DESCRIPTION OF THE INVENTION

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings. However, the scope of the claims is not limited to or restricted by the example embodiments. Like reference numerals proposed in the respective drawings refer to like elements.

Hereinafter, example embodiments will be described with reference to the accompanying drawings. However, the scope of the patent application is not limited to or restricted by such example embodiments. Like reference numerals used herein refer to like elements throughout.

Figure 1:
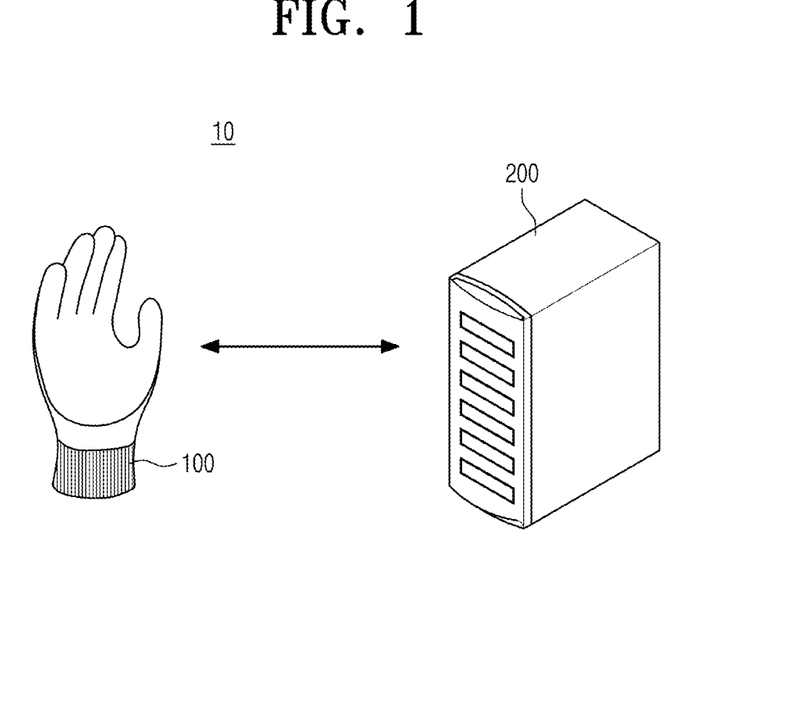
FIG. 1 shows a system according to an embodiment of the present disclosure.

FIG. 1 shows a system according to an embodiment of the present disclosure.

Referring to FIG. 1, a system 10, which may be called a VR system, etc., includes a glove 100 and a computing device 200. The system 10 can detect movement of the body of a user wearing the glove 100 (e.g., movement of a hand or fingers), apply detected movement to a virtual reality, for example, a virtual body (e.g., an avatar) in a virtual reality, and display the movement. The computing device 200, which is a device including at least a processor and/or a memory, may be a Personal Computer (PC), a tablet PC, a server, a smartphone, a note PC, etc.

Figure 2:
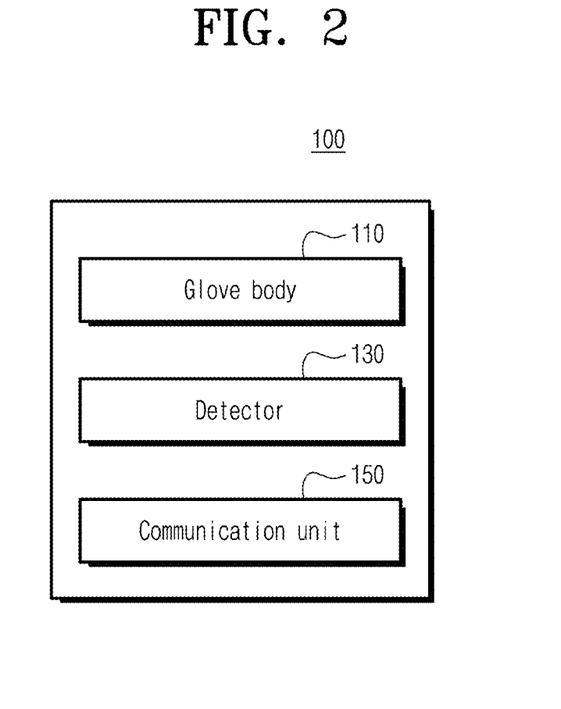
FIG. 2 is a function block diagram of the glove shown in FIG. 1.

FIG. 2 is a function block diagram of the glove shown in FIG. 1.

Referring to FIG. 2, the glove 100, which may be called a VR glove, a smart glove, etc., includes a glove body 110 and a detector 130. Depending on embodiments, the glove 100 may further include a communication unit 150. Further, the glove 100 may further include a wrist protector (not shown), but the wrist protector may be understood as a part of the glove body 110.

The glove body 110 can be worn on at least a portion of the body of a user, for example, a hand. According to an embodiment, the glove body 100 may be implemented in a shape corresponding to a corresponding body such that fingers, the back of a hand, and a wrist of a user are at least partially inserted. The detector 130 may be disposed at the glove body 100 and may be electrically coupled to the communication unit 150, which receives a detection result by the detector 130, through a wire (e.g., an electric wire). Depending on embodiments, the communication unit 150 may be spaced apart from the glove body 100 and mounted on a part of the body of a user or may be directly mounted on the glove body 100.

The glove body 110 may be made of leather not to stretch or deform at the portion at which a wire (e.g., a sewing thread) is tied (attached), but the present disclosure is not limited to the material of the glove body. Further, the glove body 110 may be understood as a concept including a wrist protector (not shown). A wrist protector is manufactured separately from the glove body 110 and then connected to the glove body 110. Even after the wrist protector and the glove body 110 are manufactured as one piece, there is an advantage that the wrist protector to which the sensing device 130 is attached can be easily attached and detached.

The detector 130 can detect movement of the body of a user (e.g., movement of a finger) and output the detection result. In detail, the detector 130 can detect variation of tension accompanying movement of a finger and output the detection result. In this case, the variation of tension causes physical variation (property variation) of a piezoelectric film and the physical variation causes electrical output variation (e.g., variation of a voltage) of the piezoelectric film, so the detector 130 can detect movement of a finger by measuring an electrical signal (e.g., a voltage). The detector 130 may be mounted on the glove body 110 or a wrist protector.

The communication unit 150 can receive an electrical signal (e.g., a voltage) that is output from the detector 130 and transmit the received electrical signal to the computing device 200 through a wired/wireless communication network. For example, the communication unit 150 can transmit data such as a measured voltage to the computing device 200 using Bluetooth. To this end, the communication unit 150 may perform operation of detecting, and/or sampling, and/or analog-to-digital converting (ADC) on an electrical signal (a voltage) that is output from the detector 130. Depending on embodiments, the communication unit 150 may be implemented as a part of the detector 130.

Further, the communication unit 150 may further include a power source that supplies power for operation of the communication unit 150.

Figure 9:
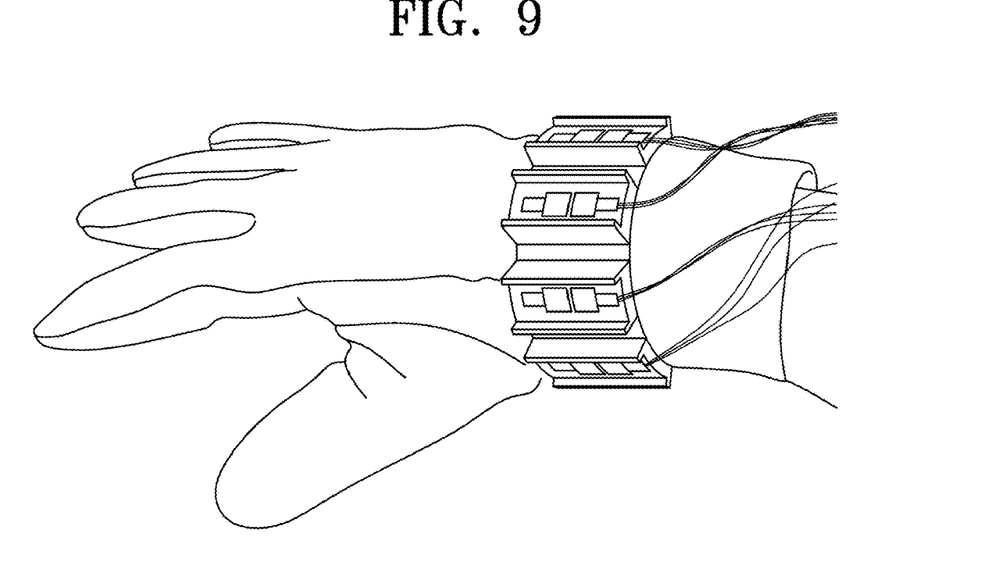
FIG. 9 shows the state in which a manufactured VR glove is worn on a user.

The state in which an actually manufactured VR glove 100 is worn on a user is shown in FIG. 9.

Figure 3:
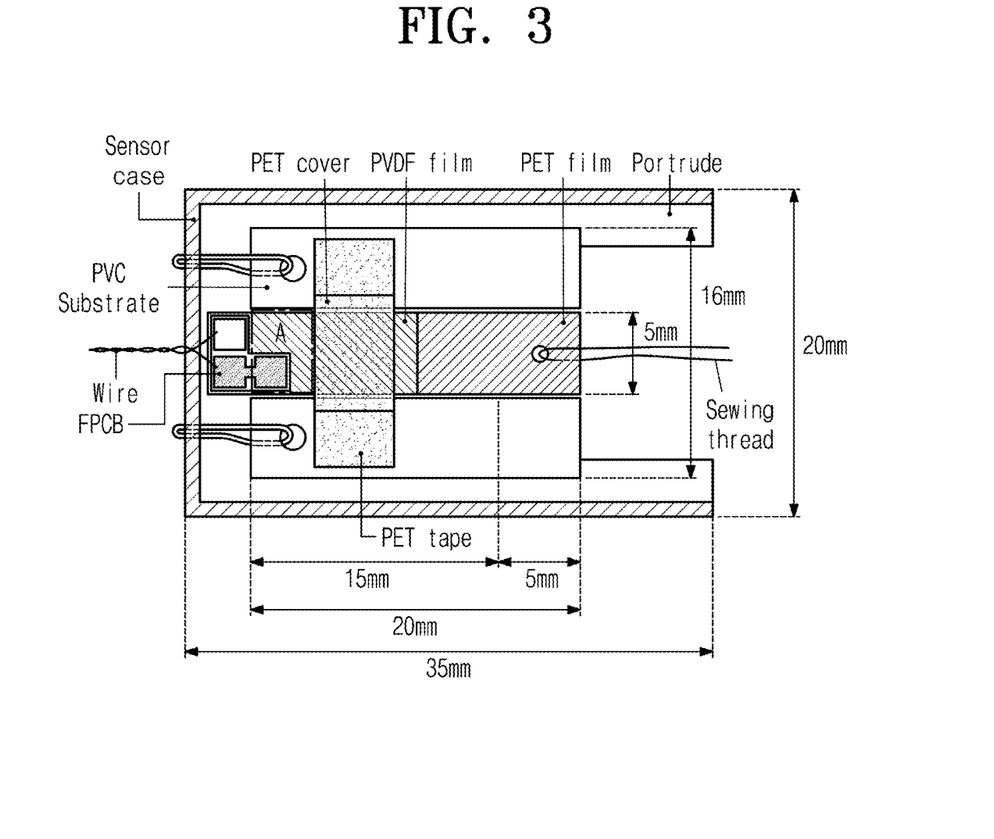
FIG. 3 is a plan view of the detector shown in FIG. 2.
Figure 4:
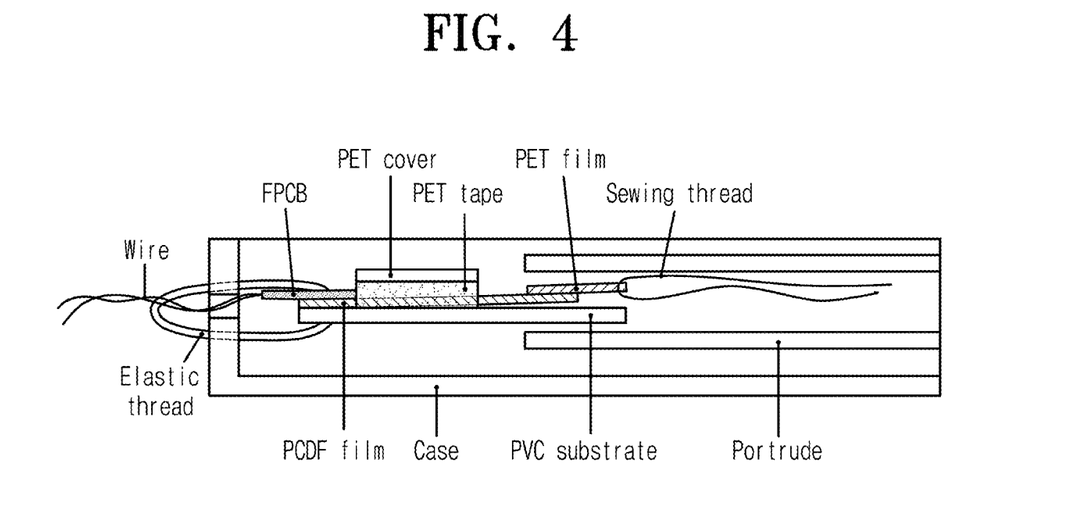
FIG. 4 is a side view of the detector shown in FIG. 2.

FIG. 3 is a plan view of the detector shown in FIG. 2 and FIG. 4 is a side view of the detector shown in FIG. 2.

Referring to FIGS. 3 and 4, the detector 130 includes a housing, a piezoelectric member, a predetermined fixing element (e.g., an elastic thread), and a wire (e.g., a sewing thread).

The housing that may be called a sensor case, a frame, or the like may have an accommodation space therein to accommodate at least a portion of the piezoelectric member.

Further, the piezoelectric member may be fixed by the predetermined fixing element at a side in the accommodation space of the housing. For example, a first side of a fixing element having elasticity is fixed at a side in the accommodation space of the housing and a second side of the fixing element is fixed to a first side of the piezoelectric member, whereby the piezoelectric member can be fixed in the housing. The fixing element may include a wire having elasticity (e.g., an elastic thread), a spring, or the like.

As a more detailed example, when two first fixing holes for fixing an elastic thread are provided on a first side surface of the accommodation space of the housing and a second fixing hole for fixing the elastic thread is provided on a first side of the piezoelectric member, the elastic thread is fastened through the first fixing holes of the housing and the second fixing hole of the piezoelectric member, thereby being able to fix the piezoelectric member at a first side in the accommodation space of the housing.

Further, an additional second fixing hole for fixing the elastic thread may be provided on the first side of the piezoelectric member and two additional first fixing holes may be provided also on the first side surface of the accommodation space of the housing to correspond to the additional second fixing hole. In this case, the piezoelectric member can be fixed in the housing through at least two elastic threads.

The fixing element having elasticity (e.g., an elastic thread) can perform the function of connecting a substrate and a housing, preventing a piezoelectric member (or a piezoelectric film) from deforming (or stretching) over a limit, and increasing the detectable angle range of a joint.

Further, a through-hole for passing a wire (e.g., a sewing thread), which transmits tension to the piezoelectric member (or a piezoelectric film), to the outside may be provided on a second side surface of the accommodation space of the housing. According to another embodiment, the second side surface of the accommodation space of the housing may be open.

Depending on embodiments, a plurality of piezoelectric members may be accommodated in the housing. In this case, the first fixing holes and the second fixing hole for fixing the elastic thread and the through-hole for passing the wire may be provided to correspond to each of the plurality of piezoelectric members. This will be described in detail below.

The piezoelectric member generates an electrical signal (e.g., a voltage) corresponding to tension that is applied. That is, the piezoelectric member may be a piezoelectric sensor that generates an electrical signal corresponding to tension that is applied.

The piezoelectric member may include a PVC substrate, a piezoelectric film (PVDF film) bonded at least at a first end on a PVC substrate, a substrate electrode (FPCB) bonded to the first end of the piezoelectric film, a conductive wire (e.g., a wire) electrically connected with an electrode included in the substrate electrode, a cover (e.g., a PET cover) covering at least a portion of the piezoelectric film and bonded on the PVC substrate, a film (e.g., a PET film) bonded to a second end of the piezoelectric film, etc.

The PVC substrate, depending on embodiments, may be a PET substrate or a substrate made of another material. The piezoelectric film (PVDF film) may be disposed on the PVC substrate in a contact state. For example, the piezoelectric film may be attached to the PVC substrate by a predetermined adhesive (e.g., epoxy paste). In this configuration, only the first end of the piezoelectric film can be bonded to the PVC substrate. The first end that is bonded is the portion to which the substrate electrode is attached, the first end of the piezoelectric film is attached on the PVC substrate, and the substrate electrode may be attached on the first end of the piezoelectric film. As another example, any one of a plurality of electrodes included in the substrate electrode may be attached to the upper portion (or the lower portion) of the piezoelectric film and another one of the plurality of electrodes may be attached to the lower portion (or the upper portion) of the piezoelectric film. However, the order and position of contact may be differently changed in accordance with embodiments.

The PVC substrate may be manufactured to have a length of 20 mm and a width of 16 mm. However, the present disclosure is not limited to the dimensions or the size of the PVC substrate and the PVC substrate has only to have a size that is smaller than the housing and allows the PVC substrate to be accommodated in the accommodation space of the housing and to be moved or deformed up to a predetermined range in the direction in which tension is applied (e.g., the horizontal direction).

The piezoelectric film may be a Polyvinylidene fluoride (PVDF) film having flexibility. The piezoelectric film, which is a main component at which an electrical signal (e.g., a voltage) is generated, may have a length of 15 mm and a width of 5 mm. However, the present disclosure is not limited to the dimensions or the size of the piezoelectric film 12.

The substrate electrode may be implemented at the first end of the piezoelectric film. According to an embodiment, the first end of the piezoelectric film and the substrate electrode may be attached by an adhesive having conductivity (e.g., a carbon conductive adhesive tape).

A wire having conductivity (e.g., an electric wire) is connected to the substrate electrode, so a measured electrical signal can be transmitted to the communication unit. The substrate electrode may be a printed circuit board having flexibility (FPCB) to prevent the substrate electrode from breaking due to physical deformation of the piezoelectric member.

The PET film is attached to the second end of the piezoelectric film. For example, the second end of the piezoelectric film and a first end of the PET film may be attached to overlap each other through an adhesive (e.g., Kapton tape). The PET film may be manufactured with a length of 10 mm and a width of 5 mm and the overlapping portion may be 5 mm.

The PET cover allows the piezoelectric film to move or deform only in an x-axial direction (the horizontal direction) without moving in a y-axial direction or a z-axial direction on the PVC substrate. That is, the PET cover prevents torsion of the piezoelectric film and allows tension to act only in a predetermined direction (the horizontal direction). To this end, the PET cover may be implemented in a type that covers at least a portion of the piezoelectric film and of which both ends are bonded to the PVC substrate. In this configuration, the PET cover should not apply interference or resistance to horizontal movement or deformation of the piezoelectric film. Accordingly, a support may be positioned between the PET cover and the PVC substrate. The height of the support should be larger than the thickness (e.g., 28 micrometers) of the piezoelectric film. Depending on embodiments, the support may be a PET tape itself.

A wire that can be implemented as a sewing thread can directly or indirectly transmit tension, which is generated by movement of a finger, to the piezoelectric film. For example, the sewing thread may be fastened to a hole provided at the PET film attached to the second end of the piezoelectric film. Since the sewing thread is fastened not to the piezoelectric film, but to the PET film, it is possible to prevent the piezoelectric film from permanently deforming such as breaking or tearing due to tension.

Figure 5A:
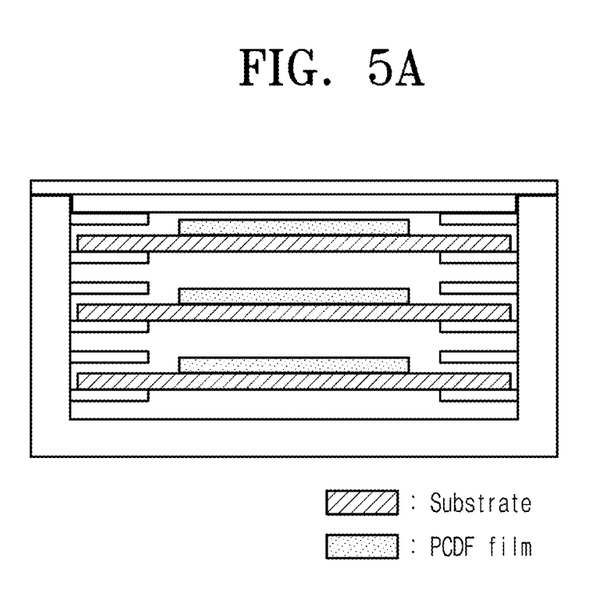
FIG. 5A is a front view of a housing accommodating a plurality of piezoelectric members.
Figure 5B:
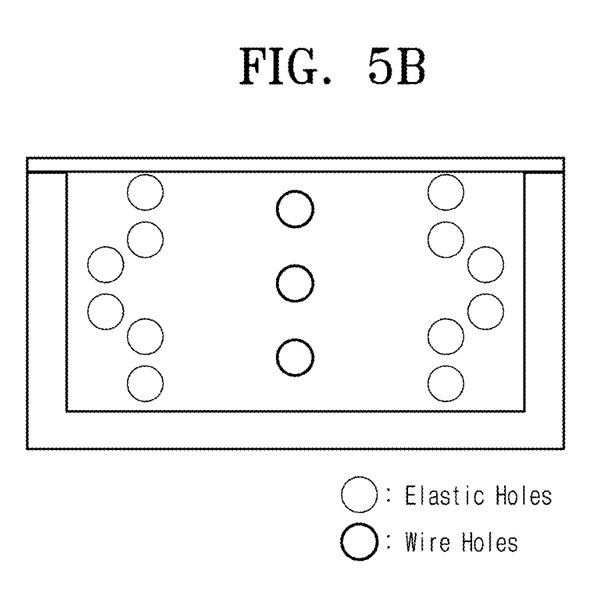
FIG. 5B is a rear view of the housing accommodating the plurality of piezoelectric members.

FIG. 5A is a front view of a housing accommodating a plurality of piezoelectric members and FIG. 5B is a rear view of the housing accommodating the plurality of piezoelectric members.

When a plurality of piezoelectric members, for example, three piezoelectric members are provided (or accommodated) in the housing, the number of accommodation spaces for accommodating the piezoelectric members, respectively, is the same as the number of plurality of piezoelectric members. Further, the plurality of piezoelectric members may be vertically stacked and accommodated. A plurality of steps (or supports) for holding the piezoelectric members, respectively, may be formed at a first side and a second side in the accommodation space of the housing. The plurality of steps may include lower steps for supporting the piezoelectric members and upper steps for restricting up-down movement. Depending on embodiments, a lower step for a piezoelectric member that is accommodated at an upper portion may be the same as the upper step for a piezoelectric member that is accommodated right under it. Accordingly, vertical movement of the piezoelectric members is restricted, and only horizontal movement or deformation of the piezoelectric members (or the piezoelectric films of the piezoelectric members) is possible.

Further, when a plurality of piezoelectric members is provided, two pairs of elastic holes for fixing the piezoelectric members in the housing may be provided for each piezoelectric member and one wire hole for passing a conducive wire (electric wire) connected to the substrate electrode may be provided for each piezoelectric member.

The housing may be made of an acryl material and may be manufactured through 3D printing. Further, the length is 35 mm and the width is 20 mm. The height of the housing is 4 mm when one piezoelectric member is accommodated in the housing, the height of the housing is 7 mm when two piezoelectric members are accommodated in the housing, and the height of the housing is 10 mm when three piezoelectric members are accommodated in the housing. However, the right range of the present disclosure is not limited to detailed numerals and the numerals of the housing may depend on embodiments.

Figure 6:
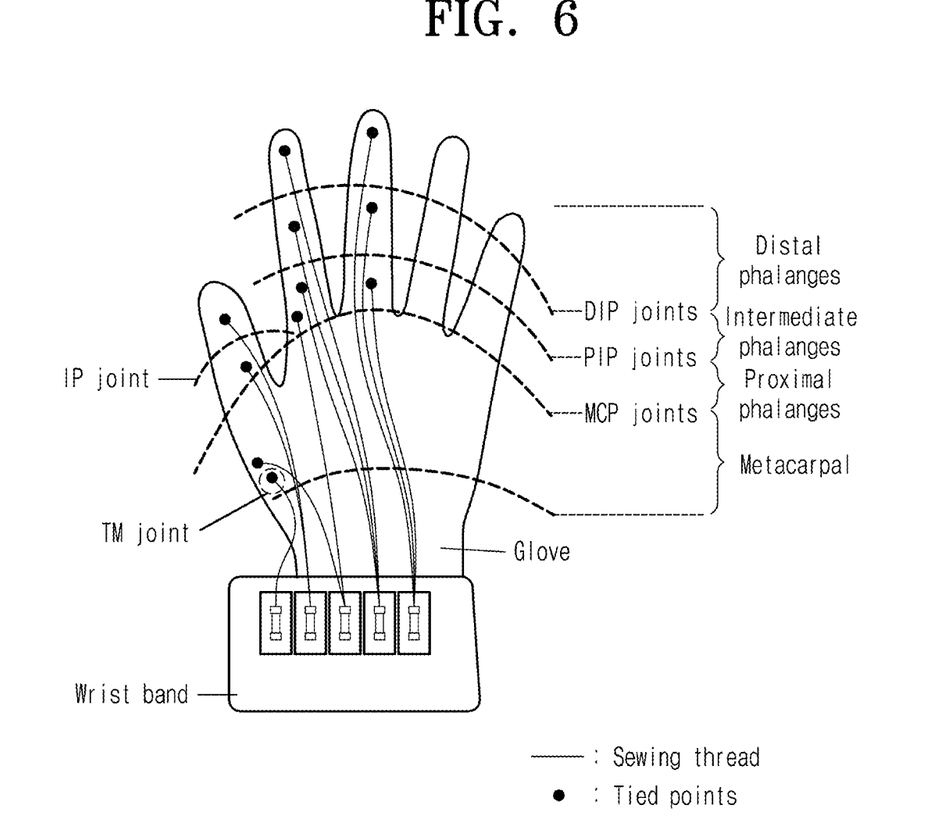
FIG. 6 is a view illustrating a structure and method of coupling a wire of a piezoelectric member and a glove body.

FIG. 6 is a view illustrating a structure and method of coupling a wire (sewing thread) of a detector and a glove body.

The wire that may be implemented as a sewing thread and has a first end fixed to the PET film of a piezoelectric member may be fixed at a predetermined position on the glove body 110. A plurality of wires may be provided and movement of a finger can be detected on the basis the magnitude of tension that is transmitted from each of the wires.

For example, at least three wires may be provided to detect extension-flexion movement of one finger (e.g., any one of the index finger, the middle finger, the ring finger, and the little finger). Since the index finger, the middle finger, the ring finger, and the little finger have three extension-flexion axes, it is possible to trace (detect) movement of the fingers using three wires (or piezoelectric members) for one finger.

Second ends of respective three wires are attached at different positions on the glove body 110, whereby movement of a finger can be detected. In detail, a first wire of three wires is attached between a Metacarpophalangeal joint (MCP joint) and a Proximal Interphalangeal joint (PIP joint) of the glove body 110 (e.g., at the middle point between the two joints or within a predetermined distance range from middle point) and can transmit tension, which corresponds to extension-flexion movement of a proximal phalange or the proximal segment, to a piezoelectric film. A second wire of the three wires is attached between a PIP joint and a distal Interphalangeal joint (DIP joint) of the glove body 110 (e.g., at the middle point between the two joints or within a predetermined distance range from middle point) and can transmit tension, which corresponds to extension-flexion movement of an intermediate phalange or the intermediate segment, to a piezoelectric film. A third wire of the three wires is attached to the upper portion of a DIP joint (e.g., distal phalange) or a middle portion of the distal segment or within a predetermined distance range from the middle point of the glove body 110 and can transmit tension, which corresponds to extension-flexion movement of a distal phalange or the distal segment, to a piezoelectric film.

Depending on embodiment, wires for detecting extension-flexion movement of the ring finger and the little finger may be omitted. Since movement of the ring finger or the little finger is similar to movement of the middle finger, it is possible to detect movement of the ring finger and/or the little finger by using the same measurement value or applying a weight in accordance with movement of the middle finger.

There is a need for an additional wire to detect abduction-adduction movement between the index finger and the middle finger. The additional wire may be attached at a certain position in the proximal segment of the index finger of the glove body 110. For example, the additional wire may be attached at a position closer to the MCP joint than the PIP joint in the proximal segment of the index finger (e.g., a position between the middle point of the proximal segment and the MCP joint). The exemplary attachment point is indicated by a yellow circle in FIG. 6.

A wire (sewing thread) should be pulled to detect tension. Accordingly, a wire (sewing thread) may be attached to be pulled when a finger segment gap, that is, the gap between the index finger and the middle finger is narrowed (when adduction occurs). As a result, a wire may be fastened with a finger gap (the gap between the index finger and the middle finger) of the glove 100 worn on a user open maximally (or at a predetermined level). As a result, when a finger gap (the gap between the index finger and the middle finger) is narrowed, tension is applied to the wire (sewing thread) and the tension of the wire (sewing thread) is transmitted to a piezoelectric film, whereby the piezoelectric film is stretched.

At least three wires may be provided to detect extension-flexion movement of the thumb. This is because the thumb has three extension-flexion axes. Second ends of three wires are attached at different positions on the glove body 110, whereby movement of a finger can be detected. In detail, a first wire of three wires is attached between the TM joint (or the CMC joint and the MCP joint of the thumb of the glove body 110 (e.g., at the middle point between the two joints or within a predetermined distance range from middle point) and can transmit tension, which corresponds to extension-flexion movement of the proximal phalange or the proximal segment, to a piezoelectric film. A second wire of the three wires is attached between the MCP joint and the Interphalangeal joint (IP joint) of the thumb of the glove body 110 (e.g., at the middle point between the two joints or within a predetermined distance range from middle point) and can transmit tension, which corresponds to extension-flexion movement of the intermediate phalange or the intermediate segment, to a piezoelectric film. A third wire of the three wires is attached to the upper portion of the IP joint (e.g., distal phalange) or a middle portion of the distal segment or within a predetermined distance range from the middle point of the thumb of the glove body 110 and can transmit tension, which corresponds to extension-flexion movement of the distal phalange or the distal segment, to a piezoelectric film.

There is a need for an additional wire to detect abduction-adduction movement between the thumb and the index finger. The additional wire may be attached at a certain position in the proximal segment of the thumb of the glove body 110. For example, the additional wire may be attached at a position closer to the TM joint than the MCP joint in the proximal segment of the thumb (e.g., a position between the middle point of the proximal segment and the TM joint). The exemplary attachment point is indicated by a red circle in FIG. 6.

A wire (sewing thread) should be pulled to detect tension. Accordingly, a wire (sewing thread) may be attached to be pulled when a finger segment gap, that is, the gap between the thumb and the index finger is narrowed (when adduction occurs). As a result, a wire may be fastened with a finger gap (the gap between the thumb and the index finger) of the glove 100 worn on a user open maximally (or at a predetermined level). As a result, when a finger gap (the gap between the thumb and the index finger) is narrowed, tension is applied to the wire (sewing thread) and the tension of the wire (sewing thread) is transmitted to a piezoelectric film, whereby the piezoelectric film is stretched.

Further, it is preferable to make the output value of a voltage obtained from a detector (or a piezoelectric member) be shown higher than the value of noise that is generated in the process of transmission to an interface (communication unit) in order to increase the accuracy in detection. Accordingly, when fastening a wire (sewing thread) to the glove body 110, it is possible to fasten the wire with a length smaller than the length of a finger (i.e., with predetermine tension applied). Accordingly, the variation of a piezoelectric film due to a finger motion increases and a higher voltage value is output, an error due to noise decreases.

Figure 7:
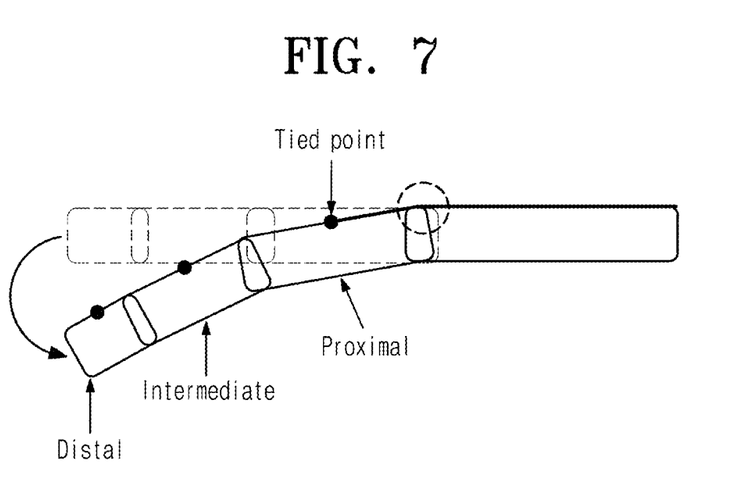
FIG. 7 is a view illustrating the principle of detecting movement of a finger.

FIG. 7 is a view illustrating the principle of detecting movement of a finger.

Referring to FIG. 7 exemplarily showing movement of an index finger, as the finger is moved and the joint angle at the portion indicated by a dotted-line circle is changed, tension is applied to the wire (sewing thread) due to extension-flexion movement at the proximal segment that is one of the finger segments. Accordingly, a wire (sewing thread) connected to each piezoelectric member may be connected (coupled or bonded) to the middle of a finger segment (or a point within a predetermined distance from the middle point) so that tension is applied to the wire when the angle of each joint is changed. Every time the finger is moved, the wire (sewing thread) is pulled and tension is applied to the piezoelectric film of a piezoelectric member, whereby the piezoelectric film is stretched. A wire (sewing thread) of a piezoelectric member is connected each of an intermediate segment and a distal segment that are other finger segments, so the piezoelectric films of the piezoelectric members can vary with movement of the finger. When a piezoelectric film is stretched, a voltage changes, and it is possible to detect variation of a finger joint by detecting the changed voltage. Similar to measuring variation of the finger segments of the index finger, it is possible to measure variation of at least one of the thumb, the middle finger, the ring finger, and the little finger.

Figure 8:
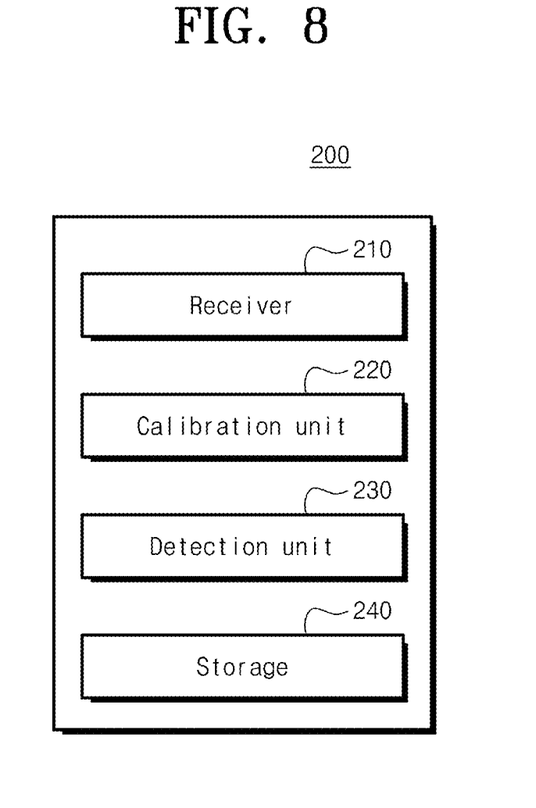
FIG. 8 is a function block diagram of the computing device shown in FIG. 1.

FIG. 8 is a function block diagram of the computing device shown in FIG. 1.

Referring to FIG. 8, the computing device 200, which may be called a VR device, a simulation device, etc., includes a receiver 210, a calibration unit 220, and a detection unit 230. Depending on embodiments, the computing device 200 may further include a storage 240.

The receiver 210 can receive voltage data from the glove 100. The voltage data can be detected and transmitted at predetermined time intervals by the glove 100. The received voltage data can be stored in the storage 240.

The calibration unit 220 can perform calibration operation for detecting movement and motion of fingers. That is, the calibration 220 can calculate information for detection operation, for example, at least one of a voltage average value, a maximum voltage value, and a gain (which may be called a weight, etc.) of each detector (or each piezoelectric member). The calculated information can be used for detection operation by the detection unit 230.

Voltage data transmitted from the glove 100 are changed with respect to a predetermined voltage, depending on the variation amount (or property variation amount) of a piezoelectric film. A process of integral is required to calculate angle variation of a finger joint on the basis of the received voltage data and the average value (voltage average value) of the voltage data should be subtracted before the process of integral is performed.

The voltage average value may be calculated as the average of the received voltage data without the worn glove 100 moving for a predetermined time. Further, while a virtual reality is performed, the average value is increased when an integral value increases, and on the contrary, the voltage average value is decreased when the integral value decreases, whereby the integral value can be adjusted not to change sensitively to variation of a hand. This adjustment operation may be performed by the detection unit 230 to be described below.

The calibration unit 220 can calculate a gain and/or a maximum voltage value that is used in the process of deriving the joint angle of a finger from an integral result. The gain may be calculated on the basis of the maximum voltage value calculated by the calibration unit 220. Depending on embodiments, the gain may be calculated by any one of the calibration unit 220 and the detection unit 230.

In detail, in order to express an integral result into a joint angle, it is required to give a gain such that the maximum angle (or the minimum angle) that each finger joint can show is the same as the maximum voltage output of the detector (or piezoelectric member) that detects the joint. Accordingly, the calibration unit 220 can obtain a maximum voltage value that each of the piezoelectric members of the worn glove 100 can generate (through the receiver 210). The maximum voltage value may be the largest value of a plurality of voltage values that is received with a finger maximally bent in the case of extension-flexion movement. Further, in the case of abduction-adduction movement, the adduction state induces largest variation of a piezoelectric film, so the maximum voltage value may be the largest value of a plurality of voltage values that is received with fingers moved closest to each other.

The gain may be a value derived by dividing the maximum bendable angle of each joint (or the maximum narrow (adduction) angle) by the maximum voltage angle.

The detection unit 230 can derive a voltage variation amount corresponding to finger movement (a joint angle). To this end, the detection unit 230 can perform integral operation on the voltage data. Integral is performed on the value obtained by subtracting the voltage average value from the voltage data and may be performed using Equation 1.

$$V_{ac}^{exp}(t_n) = \frac{1}{R_{in} C_p} \sum_{m=1}^{n} [V_{load}(t_m) \times \Delta t] + V_{load}(t_n) \quad \text{[Equation 1]}$$

In Equation 1, $V_{oc}^{exp}$ is an integral value, $R_{in}$ is load resistance (of an interface board, for example, which may mean load resistance of the communication unit 150), $C_p$ is capacitance of a piezoelectric film, $V_{load}$ is received voltage data, $\Delta t$ is a time interval at which one voltage datum is transmitted (or a time interval at which one voltage datum is sensed), and $t_n$ is a time measured up to now (i.e., a current point in time or measurement time). Further, a rectangular rule was used in the integral of Equation 1.

The detection unit 230 can calculate the joint angle of each joint from the integral result. In order to express an integral value into a joint angle, it is required to give a gain such that the maximum angle that each finger joint can show is the same at the maximum voltage value of the piezoelectric member that detects the joint. Accordingly, the detection unit 230 can calculate the joint angle of each joint by multiplying an integral value by the gain.

Further, the detection unit 230 may apply a measured joint angle to a virtual hand in a virtual reality and display the virtual hand to which the measured joint angle has been applied through a display device included in the computing device 200.

Figure 10:
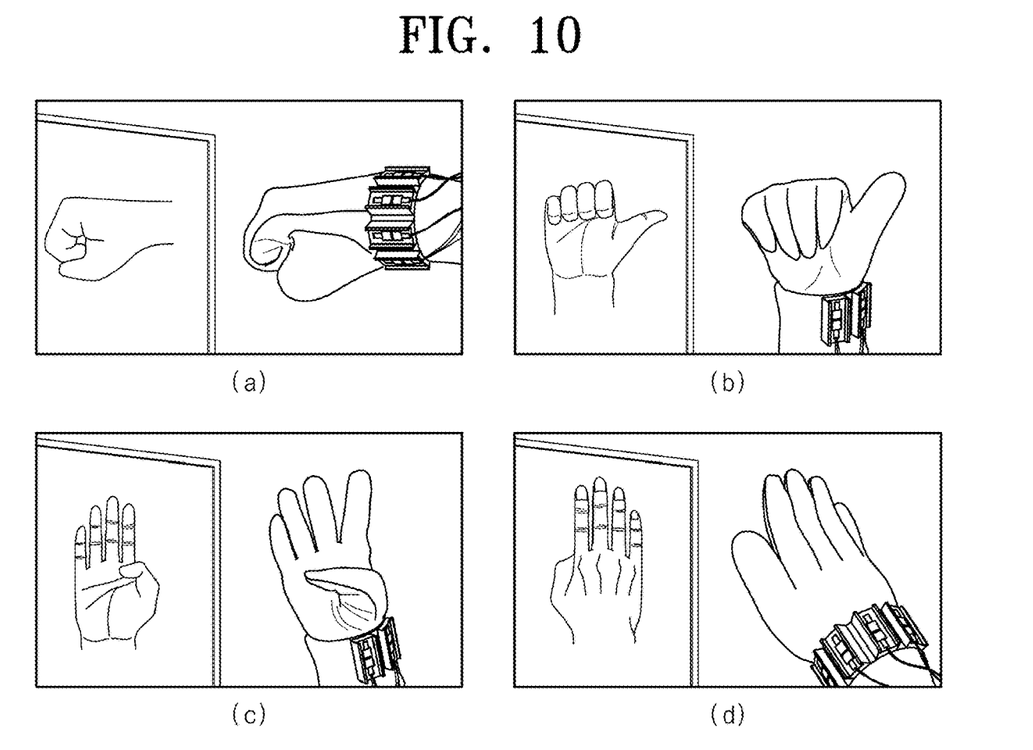
FIG. 10 shows an example in which the VR glove detects movement of a user's hand, and a virtual hand in a virtual environment is displayed in the same way as the user's hand.

The virtual hand may mean a hand of an avatar, etc. in the virtual reality. FIG. 10 shows an example in which the VR glove detects movement of a user's hand and a virtual hand in a virtual environment is displayed in the same way as the user's hand.

An Operation System (OS), application programs, etc. for operation of the computing device 200 may be stored in the storage 240. Further, the voltage data received by the receiver 210, the result of calibration operation by the calibration unit 220, the detection result by the detection unit 230, etc. may be stored in the storage 240.

The aforementioned method according to example embodiments may be implemented in a form of a program executable by a computer apparatus. Here, the program may include, alone or in combination, a program instruction, a data file, and a data structure. The program may be specially designed to implement the aforementioned method or may be implemented using various types of functions or definitions known to those skilled in the computer software art and thereby available. Also, here, the computer apparatus may be implemented by including a processor or a memory that enables a function of the program and, if necessary, may further include a communication apparatus.

The program for implementing the aforementioned method may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although some example embodiments of an apparatus and method are described, the apparatus and method are not limited to the aforementioned example embodiments. Various apparatuses or methods implementable in such a manner that one of ordinary skill in the art makes modifications and alterations based on the aforementioned example embodiments may be an example of the aforementioned apparatus and method. For example, although the aforementioned techniques are performed in order different from that of the described methods and/or components such as the described system, architecture, device, or circuit may be connected or combined to be different form the above-described methods, or may be replaced or supplemented by other components or their equivalents, it still may be an example embodiment of the apparatus and method.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents. Therefore, various other implementations, various other embodiments, and equivalents of the invention disclosed in the claims are encompassed by the scope of claims set forth below.

Although the present invention is described with reference to the example embodiments illustrated in the drawings, it is provided as an example only and it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A Virtual Reality (VR) glove comprising:
a glove body; and
a detector,
wherein the detector includes:
a housing having an accommodation space therein;
a piezoelectric member having a first side fixed at a first side in the accommodation space; and
a wire connected to the piezoelectric member and extending through a hole provided at a second side of the housing,
wherein the wire is attached to any one finger of a plurality of fingers included in the glove body,
wherein the piezoelectric member includes:
a substrate;
a piezoelectric film having a first side attached on the substrate; and
a film having a first side attached on a second side of the piezoelectric film, and the wire is attached to a second side of the film.

2. The VR glove of claim 1, wherein the first side of the piezoelectric member is fixed at the first side in the accommodation space through a wire having elasticity.

3. The VR glove of claim 1, wherein the piezoelectric member further includes a substrate electrode attached to the first side of the piezoelectric film, and
the substrate electrode is electrically connected with a conductive wire.

4. The VR glove of claim 3, further comprising a communication unit,
wherein the communication unit transmits an electrical signal that is transmitted from the conductive wire to an external computing device.

5. The VR glove of claim 1, wherein the piezoelectric member further includes a cover attached to the substrate while covering at least a portion of the piezoelectric film, and
the cover and the substrate are attached using a PET tape having a thickness larger than a thickness of the piezoelectric film.

6. The VR glove of claim 1, wherein, in order to detect extension-flexion movement of any one finger of the plurality of fingers, the wire is attached to a segment of the any one finger.

7. The VR glove of claim 1, wherein, in order to detect abduction-adduction movement between a thumb and an index finger of the plurality of fingers, the wire is attached to a proximal segment of the thumb.

8. The VR glove of claim 1, wherein, in order to detect abduction-adduction movement of an index finger and a middle finger of the plurality of fingers, the wire is attached to a proximal segment of the index finger.

9. The VR glove of claim 1, comprising a plurality of detectors,
wherein each of the plurality of detectors accommodates at least one piezoelectric member,
three wires of a plurality of wires connected with a plurality of piezoelectric members, respectively, are connected to segments of an index finger, respectively, to detect extension-flexion movement of the index finger, and
three other wires of the plurality of wires are connected to segments of a middle finger, respectively, to detect extension-flexion movement of the middle finger.

10. The VR glove of claim 9, wherein a first wire of the plurality of wires is connected to a proximal segment of the index finger to detect abduction-adduction movement of the index finger, and
a second wire of the plurality of wires is connected to a proximal segment of a thumb to detect abduction-adduction movement of the thumb.

11. The VR glove of claim 1, wherein the wire is attached such that predetermined tension is applied to the wire when the glove body is worn on a user.

12. The VR glove of claim 11, wherein the wire is attached to a proximal segment of an index finger with the index finger and a middle finger maximally open.

13. The VR glove of claim 11, wherein the wire is attached to a proximal segment of a thumb with the thumb and an index finger maximally open.

14. A Virtual Reality (VR) glove comprising:
a glove body; and
a detector,
wherein the detector includes:
a housing having an accommodation space therein;
a piezoelectric member having a first side fixed at a first side in the accommodation space; and
a wire connected to the piezoelectric member and extending through a hole provided at a second side of the housing,
wherein the wire is attached to any one finger of a plurality of fingers included in the glove body, and
wherein, in order to detect extension-flexion movement of any one finger of the plurality of fingers, the wire is attached to a segment of the any one finger.

15. A Virtual Reality (VR) glove comprising:
a glove body; and
a detector,
wherein the detector includes:
a housing having an accommodation space therein;
a piezoelectric member having a first side fixed at a first side in the accommodation space; and
a wire connected to the piezoelectric member and extending through a hole provided at a second side of the housing,
wherein the wire is attached to any one finger of a plurality of fingers included in the glove body, and
wherein, in order to detect abduction-adduction movement between a thumb and an index finger of the plurality of fingers, the wire is attached to a proximal segment of the thumb.

* * * * *